United States Patent [19]

Meeker et al.

[11] 4,431,105

[45] Feb. 14, 1984

[54] MATERIAL FEED UNIT FOR AN INJECTION MOLDING MACHINE

[75] Inventors: Gregory W. Meeker; Frank W. Scarson, Jr., both of Webster, N.Y.

[73] Assignee: USM Corporation, Farmington, Conn.

[21] Appl. No.: 273,726

[22] Filed: Jun. 15, 1981

[51] Int. Cl.³ .............................................. B65G 47/18
[52] U.S. Cl. .................................... 198/523; 198/550; 198/671
[58] Field of Search ............... 198/671, 674, 675, 540, 198/550, 614, 616, 602, 523; 425/208, 553; 417/496, 490; 264/176 R; 366/76, 150; 222/254, 227, 23, 256; 414/217

[56] References Cited

U.S. PATENT DOCUMENTS

| 1,716,317 | 6/1929 | Lowy | 222/254 |
| 2,765,899 | 10/1956 | Ballard | 198/674 X |
| 2,888,155 | 5/1959 | Raymer, Sr. et al. | 414/217 |
| 3,978,978 | 9/1976 | Herter | 198/674 X |
| 4,077,509 | 3/1978 | Berg, Jr. | 198/747 |

FOREIGN PATENT DOCUMENTS

| 1557158 | 12/1970 | Fed. Rep. of Germany | 366/76 |
| 48108 | | Japan | 264/176 R |

Primary Examiner—Joseph E. Valenza
Assistant Examiner—Dennis J. Williamson
Attorney, Agent, or Firm—Vincent A. White

[57] ABSTRACT

A plunger feed system for feeding stiff or thickened material into the injection unit barrel of an injection molding machine, minimizing the feed path of the material, to minimize the degradation of the fibers in the material. The system comprises a pair of pressurizable rams acutely arranged over an injection barrel, each ram also arranged perpendicular to the other, to facilitate the feeding operation and minimize material degradation.

8 Claims, 2 Drawing Figures

MATERIAL FEED UNIT FOR AN INJECTION MOLDING MACHINE

BACKGROUND OF THE INVENTION (1) Field of the Invention

This invention relates generally to injection molding machines, and more particularly to material feed systems for injection molding machine injection units.

(2) Prior Art

Heretofore with injection molding of glass reinforced polyester, the material has been hand-laid into the feed hoppers of injection molding machine injection units. The particular material involved is stiff and several centimeters or more thick, and have fibers several thicknesses long, which are characteristics that are desirable in the end product properties. If the material is "worked" too much prior to the injection molding operation, the material may be degraded and lose these valuable properties. To minimize the degradation, the material should not be handled nor "worked" excessively which would otherwise break and thus shorten the fibers in the material reducing its strength.

U.S. Pat. No. 3,979,488 to Greenhalgh et al shows a feed mechanism for an injection molding machine. This feed mechanism comprises several reciprocable screws each in long cylindrical material flow paths which would be detrimental to the final properties of any thickened material of the type utilizable in the present invention.

U.S. Pat. No. 4,003,498 to Monegham discloses an apparatus for feeding high bulk material to an extrusion apparatus, however, the system includes an agitated hopper, a flexible auger in a very long closed path leading to a plasticating screw. Such a feed system would destroy the fiber structure of glass reinforced polyesters which are the compounds "worked" in the present invention.

Another machine know in the prior art is a Farrel auger-hopper wherein a first plunger and second plunger are arranged on either side of an extruder screw. The plungers act to feed hot melt thermoplastic material into the extruder screw for processing into pellet form. Such a system used to feed glass reinforced polyester material has been partially tested by Farrel, but has not been applied under production conditions.

It is thus an object of the present invention to provide a material feed system for feeding long fibered glass reinforced polyester material into an injection molding machine injection unit with minimal working or breaking down of the glass fibers prior to their being injection molded.

It is a further object of the present invention to provide a flow path for glass reinforced polyester material entering the injection unit which is as linear as practicable and comports well with the direction of extrudite from the injection unit.

BRIEF SUMMARY OF THE INVENTION

The present invention comprises a plunger feeder arrangement for feeding the injection unit of an injection molding machine, wherein a first packing cylinder and a second feed cylinder are arranged contiguous to and between an open hopper and a reciprocable rotatable screw of an injection unit. The first and second cylinders are disposed over the reciprocable screw in the vertically arranged plane that longitudinally bisects the same. The longitudinal axes of the first and second cylinders are also preferably disposed at a right angle with respect to one another and are each preferrably disposed at 45° with respect to the axis of rotation of the reciprocable screw. The packing cylinder is disposed in the lower porion of the hopper to pack the material into the void for subsequent plunging into the screw cavity. This disposition of pressurizable plungers minimizes the handling and attendant wear of the fibers in any material being injected. Utilizing the reciprocable screw to at least partially advance the material along the screw chamber further minimizes the handling and wear of the fibers in the material.

BRIEF DESCRIPTION OF THE DRAWINGS

The objects and advantages to the present invention will become more apparent when viewed in conjunction with the following drawings, in which.

DESCRIPTION OF THE PREFERRED EMBODIMENTS

Figure 1:
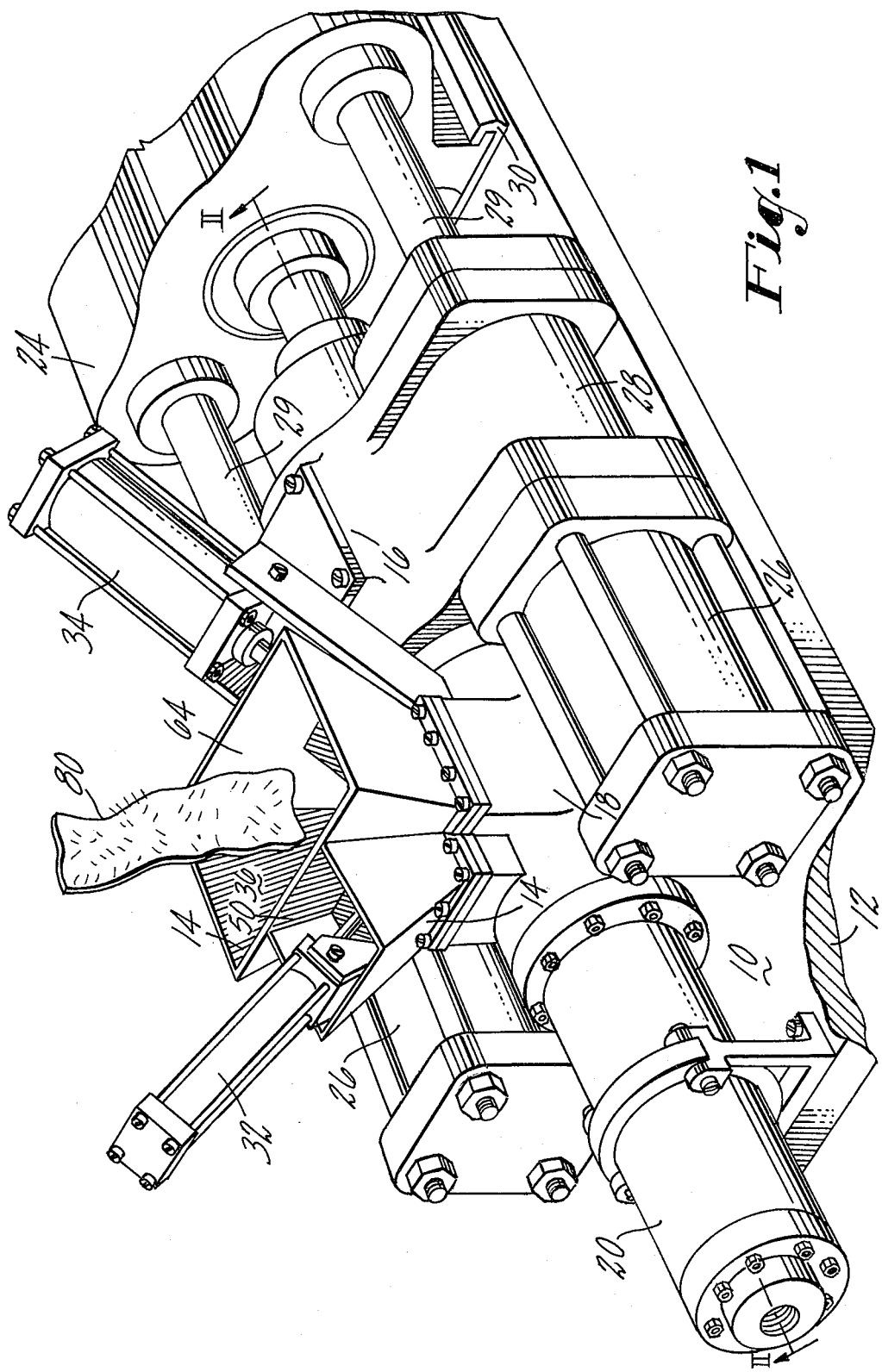
FIG. 1 is a perspective view of an injection unit having a material feed system constructed according to the principles of the present invention.
Figure 2:
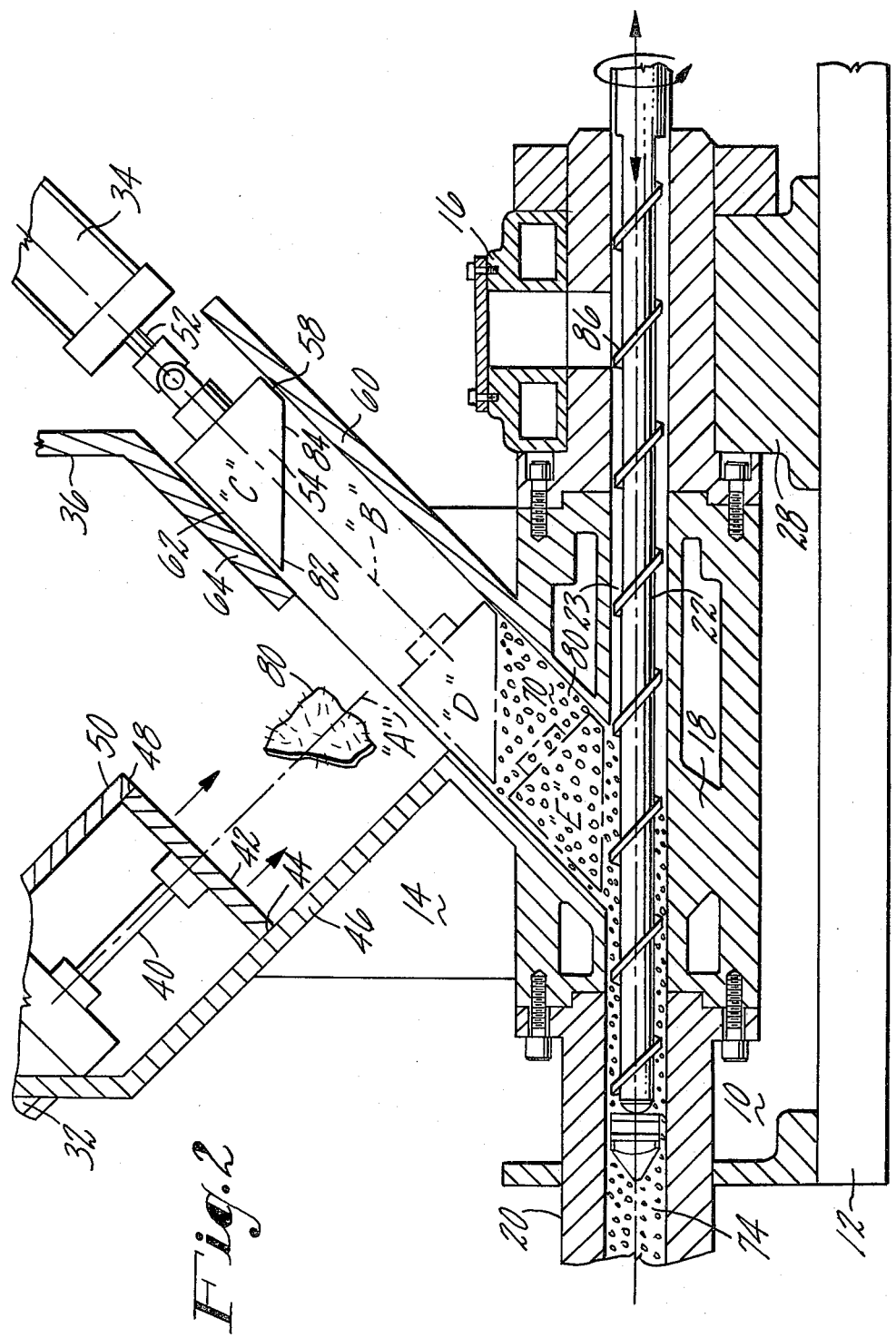
FIG. 2 is a view of the material feed system and injection unit taken along the lines II—II of FIG. 1.

Referring now to the drawings in detail, and particularly to FIG. 1, there is shown an injection unit 10 mounted on a base 12. The injection unit 10 comprises a feed mechanism 14 arranged on the top thereof, a rear barrel section 16, a barrel feed section 18 on which the feed mechanism 14 is mounted, and a front barrel section 20 through which material may be injected. A rotatable screw 22, shown in FIG. 2, is connected to and rotatably driven in a cylindrical chamber 23 by a drive unit 24, which drive unit is shown in FIG. 1. A pressurizable cylinder 26 is longitudinally arranged on each side of the rear and barrel feed sections, 16 and 18 and are each connected to a housing 28 on the rear barrel section 16. The cylinders 26 each have a shaft 29 which connectively extend to the drive unit 24. The drive unit 24 is slidably supported on a track 30 mounted on the base 12.

The feed mechanism 14, mounted over the barrel feed section 18 comprises a packing cylinder 32 and a screw feed cylinder 34 arranged at a right angle with respect to one another and which generally intersect within a hopper 36 centrally disposed therebetween. Both the packing cylinder 32 and the screw feed cylinder 34 are disposed in the vertical plane which bisects the longitudinal axis of the rotatable screw 22.

The packing cylinder 32 has a locus of travel "A" which is inclined at an angle of about 45° to the axis of rotation of the screw 22, and the screw feed cylinder 34 has a locus of travel "B" which is also inclined at an angle of about 45° with respect to the axis of rotation of the screw 22. The packing cylinder 32 includes a pressure actuatable piston, not shown, therewithin, having a first shaft 40 extending therefrom. A packing plate 42 is disposed on the distal end of the first shaft 40, which is arranged to slide along a lower edge 44 thereof on a first sidewall 46 of the hopper 36. An upper edge 48 of the packing plate 42 fits between the first sidewall 46 and an inner wall 50 of the hopper 36 when the piston and its shaft 40 are fully retracted.

The screw feed cylinder 34 includes a pressure actuatable piston, not shown, therewithin, having a second shaft 52 extending therefrom. A feed ram 54, which may be of wedge shape, is disposed on the distal end of the second shaft 52, which ram 54 is arranged to slide along a lower side 58 thereof, on a second sidewall 60 of the hopper 36. An upper side 62 of the ram 54 slides along an inner wall 64 of the hopper 36, the inner wall 64 preferably covering the entire upper side 62 of the ram 54 when the ram 54 is in its retracted most position. When the ram 54 is in its most extended position from the screw feed cylinder 34, it is disposed in a feed chamber 70 in the lowermost portion of the hopper 36, leading directly into the cylindrical chamber 23 which the screw 22 rotates. The cylindrical chamber 23 extends through the barrel feed section 18 and into a shot chamber 74 in the front barrel section 20, from where any material therein may be injected into a proper mold or die device, not shown.

In operation of the injection unit 10, a quantity of stiff or thickened sheets of glass reinforced polyester material 80 may be fed into the hopper 36 of the feed mechanism 14, from a conveyor belt or unit discharge system, not shown, whereupon the packing cylinder 32, would be pressurized upon receipt of a proper signal, to effectuate advancing movement of the packing plate 42 and thus movement of some material 80 toward the second sidewall 60, minimizing any "working" or bending of the material 80 or its constituent fibers. The inner wall 50 over the first shaft 40 and packing plate 42 prevents any material from falling therein, and otherwise wasting material or hindering production efficiency. After the packing plate 42 has reached its forward most position, a signal from a proper source, not shown, may then effectuate pressurization of the packing stroke of the screw feed cylinder 34 and corresponding downward advancement along locus "B", of the feed ram 54 from position "C" to position "D". The feed ram 54 may have a leading edge 82 which may shear any material 80 caught between it and the first sidewall 46, to minimize any other type of "working" which might otherwise degrade the material. The feed ram 54 also has a face 84 the plane of which is generally parallel to the axis of rotation of the screw 22. This orientation of the face 54 more properly compresses the material 80 into the feed chamber 70 without otherwise working and degrading the material 80. Upon complete charging the feed chamber 70 with a quantity of material 80, which results from a number of packing cycles of the packing and feed rams, screw feed cylinder 34 is pressurized, upon actuation by a proper signal, to full stroke through the feed chamber 70 moving from position "D" to position "E" and forcing the quantity of material 80 into the flights of the rotating reciprocating screw. After reaching position "E" upon activation by a proper signal, screw feed cylinder 34 is depressurized and retracted to position "C" moving the ram 54 and shaft 52 between the inner wall 64 and the second sidewall 60, to await a signal to complete a subsequent cycle anew. The screw 22, may have an arrangement of flights 86 therearound which each have a radial gap between its outermost portion, and the walls of the chamber 23 in which it rotates. The pressurizable cylinders 26 may be actuated to provide a reciprocable motion to the drive unit 24 to which they are attached. The drive unit 24, thus imparting a rotational movement upon the screw 22 as well as a reciprocable movement thereto, provides a forward movement to the material within the chamber 23 towards the shot chamber 74 for subsequent extrusion with minimum degradation of the material.

Thus there has been shown a feed mechanism for an injection unit utilizable to inject stiff material having fibers or the like therein, which fibers or material has particular properties which would be desirable to maintain in the end product.

We claim:

1. A material feed unit, for feeding material with a fibrous texture to an injection unit having a reciprocable screw, said material feed unit comprising:
   a hopper for receiving a quantity of said material;
   a first angularly arranged reciprocal plunger in its retracted most position is enclosed by a partial inner wall of said hopper;
   a second angularly arranged reciprocal plunger in its retracted most position is enclosed by a partial inner wall of said hopper;
   said first and second plungers being arranged in the vertical plane that bisects the axis of rotation of said screw.

2. A material feed unit, as recited in claim 1, wherein the locus of movement of said first plunger is about 90° with respect to the locus of movement of said second plunger.

3. A material feed unit, as recited in claim 1, wherein the locus of movement of said second plunger is about 45° with respect to the axis of rotation of said screw.

4. A material feed unit, as recited in claim 1, wherein said first plunger pushes a quantity of material from said hopper into the locus of movement of said second plunger.

5. A material feed unit, as recited in claim 1, wherein said second plunger has a ram having a face which is generally parallel to the axis of rotation of said screw.

6. A material feed unit, as recited in claim 5, whereifn said second plunger has a leading edge on said ram face which is arranged to slice any material between said ram and a wall of said hopper.

7. A material feed unit, as recited in claim 5, wherein said screw is reciprocably movable in a screw chamber in said unit, by engagement with a reciprocable drive unit.

8. A material feed unit, as recited in claim 7, wherein said screw has an arrangement of flights therearound, which have a radial gap between said flight and the walls of said screw chamber, to minimize any degradation of extrudable material therewithin.

* * * * *